Figure 5:
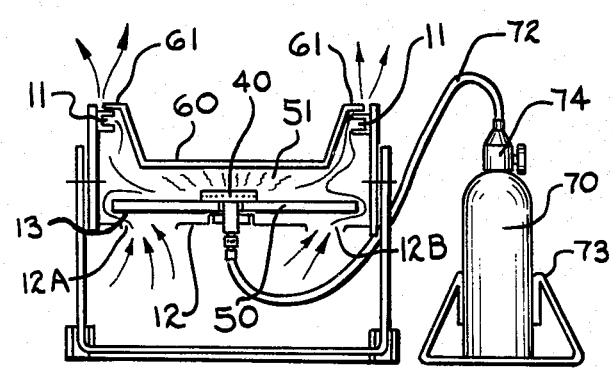

United States Patent [19]
Krueger

[11] 3,895,622
[45] July 22, 1975

[54] REVERSIBLE COOKING UNIT

[76] Inventor: Wallace F. Krueger, 4401 Merriweather Ave., Toledo, Ohio 43623

[22] Filed: Mar. 18, 1974

[21] Appl. No.: 452,780

[52] U.S. Cl. ................................. 126/38; 99/340
[51] Int. Cl.² ............................................ F24C 3/14
[58] Field of Search .................. 126/38, 41 R, 39, 9; 99/339, 340

[56] References Cited
UNITED STATES PATENTS
3,103,160 9/1963 Forniti et al. .......................... 99/339
3,789,748 2/1974 Rappoport et al. ................... 99/340
3,791,368 2/1974 Hunt ............................... 126/9 R X

*Primary Examiner*—Edward G. Favors

[57] ABSTRACT

The present invention, Reversible Cooking Unit, pertains to a compact and self-contained, complete, portable, gas-fired cooking unit adaptable for all outdoor uses which can also be used indoors when sufficient ventilation is provided.

2 Claims, 10 Drawing Figures

PATENTED JUL 22 1975　　3,895,622
SHEET　　1
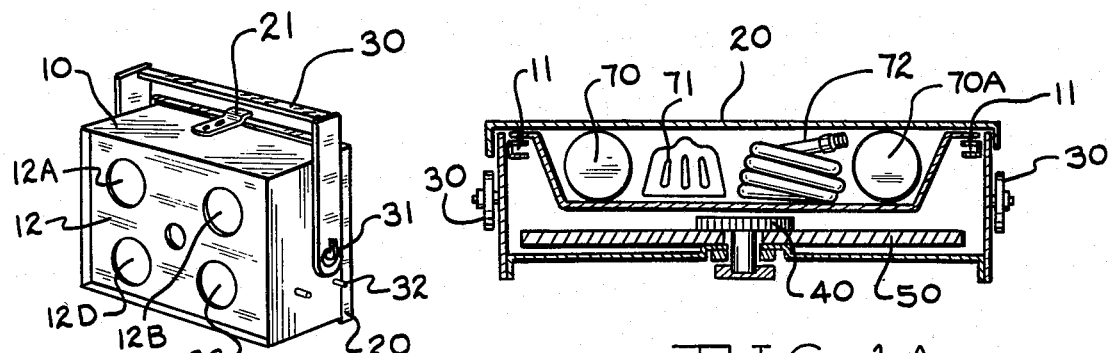
FIG. 1
FIG. 1A
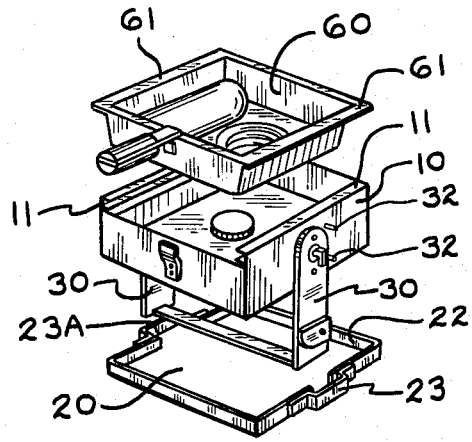
FIG. 2
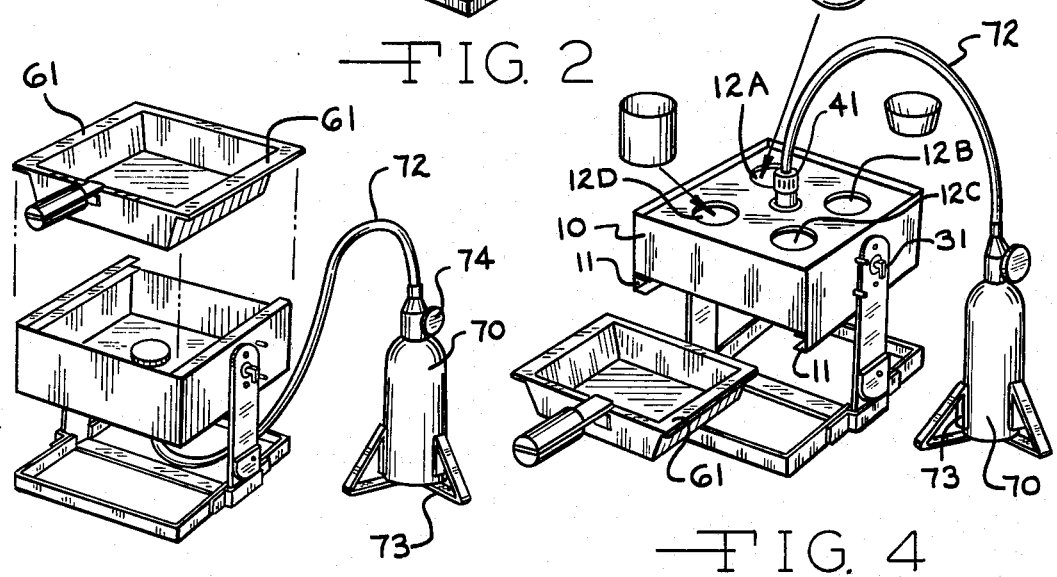
FIG. 3
FIG. 4

REVERSIBLE COOKING UNIT

The invention contemplates in its basic design a novel radiant heat reflector with integral gas burner and housings that can be rotated (flip, floped 180°) for either broiling or frying. This design provides advantages for several different modes of cooking: direct flame radiation, radiant reflection, direct flame impingement and also convection heat transfer. With the successful utilization of these modes of heating into a self-contained, compact, efficient cooking stove, and extremely versatile food preparation unit is provided. The unit can be used for cooking in one or in combination with the following methods:

1. As a Bar-B-Q broiler or
2. As a combination broiler and pot heater
3. As a frying pan
4. As a directed burner for pot heating or
5. As a direct burner for direct flame-food cooking To more completely understand and appreciate the novelty and utility of the present invention, a brief description should be made of the present methods and means of food preparation with what is commonly known as outdoor bar-b-quing and camp cooking Standard bar-b-quing involves the preparation for food over a charcoal fire that is contained in a bowl or container. The rate of cooking is controlled by changing the relative distance the food is above the heat surface, damper control on the air intake to the fuel combustion area, shrouding or hooding the entire fire and cooking unit (resulting in smoke cooking), and/ or the simplest system of reducing fire and heat by the application of water to hold heat to the desired level. Any one or all of the above methods are used depending on complexity of the bar-b-q unit construction. Another popular method to achieve the same results with more convenience is to gasfire simulated charcoal briquettes (made of ceramics, volcanic rock, etc.). Easy, instant starting and shut-off with intermediate heat control is possible, and portability can be achieved by utilizing bottle fuel. This method of cooking gives the so-called charcoal taste to the prepared food which is basically the burning of grease and juices from the food, dripping into the hot fire and coals. For this reason this method of cooking is basically an outdoor operation because of the heat and smoke generated.

To provide a more efficient and portable stove for direct camp use, those manufactured provide one, two or three burner style units that are fueled by liquid or gas supply tanks. In all present designs the burners simulate or copy the same principle used in standard indoor cooking ranges and stoves. The unit must be shrouded, which is frequently ineffective in most cases, to prevent wind interference. This provides only direct pot or pan heating and auxilliary accessories are necessary for grilling, toasting, baking, etc. Also, the extra accessories do not fit into an integral design for portability and storage in the basic unit, and must be handled separately. This is true for all cooking utensiles such as a frying pan, forks, spatulas, etc. Most designs provide no means to cook, heat, toast, etc., from one basic heat source, all at the same time. This can be accomplished only by using two and/or three burner units simultaneously and consequently a large stove, plus additional accessories are needed. The net result is a larger unit and two to three times the fuel requirements which result in very inefficient utilization of heat supplied. Cooking outdoors, if the temperature is below normal indoor ambient and if any wind exists (even of a very minimum nature) the heating and cooking process on standard camp stoves is very poor and inefficient and frequently impossible under severe conditions of wind and cold. In all existing designs, separate folding stands as well as separate carrying cases are required to provide any type of system approaching a complete cooking package.

The present invention provides a system to give total cooking flexibility, system control, and a complete, portable package for home and outdoor food preparation. Several modifications can be employed utilizing the basic principles in providing different designs, sizes, as well as cooking and heating possibilities.

The basic design consits of rigid insulating radiant heat reflector or ceramic infrared transmitter panel with a special burner head located in the center of the panel. This panel can be round or square and of any size adaptable for the application and the fuel power requirements. The basic principle of design of the present invention permits rotating of the panel and burner to permit two distinct and important modes of cooking:

1. As a standard gas burner with the burner located on the top surface of the panel, and the food to be cooked placed above the burner.
2. As a radiant reflector panel with the burner located on the bottom side of the panel and the food to be cooked placed beneath the burner and the flue gas channeled for additional heating if desired.

The change of cooking modes is accomplished in this novel cooking unit by inverting the panel with burner 180° from one position to the other. By utilizing this principle the final cooking units evolve that can provide unique cooking possibilities.

A. When the burner head is located on the top surface of the panel, this is the normal position for pan, pot and direct fire heating. The pan or pot is positioned above the burner and with the housing and shroud design, as shown in the accompanying drawings, secondary combustion air flows to and from burner head to give efficient and directed heat and at the same time providing shrouding to prevent wind interference.

B. When the burner head is located on the bottom surface of the radiant reflector panel, the flame emits from the burner head and will travel outward to the edges of the panel and then rise upward following the normal flow of rising flue gases. The panel is of an insulating and reflective nature and thus the maximum heat of combustion, particularly radiant heat is directed downward with the flame and hot flue gas traveling over, and curling upward, from the radiant panel. In this mode of operation, the radiant panel becomes a heat source along with the flame for broiling, baking and cooking food placed under this panel. Also because the flame is between the food and the radiant panel the under surface of the panel is constantly fire cleaned and cleansed of any grease spatter which is burned in the flame and conducted outward and upward with the flue gas. In this mode of operation, all outdoor cooking normally performed by charcoal cooking, can be quickly and more cleanly done by radiant heat broiling, giving essentially smoke free cooking and searing of the food from the top surface and thus preventing fats and juices from escaping and burning. This cooking is totally controlled by the volume adjustment of fuel to the burner and the distance the pan containing the food is located, relative to the radiant panel.

By shrouding (accomplished by basic housing) the heat rising upward over the edges of the panel is redirected over the top surface of the panel and up through openings in the top of the housing. This design provides the basic need for combustables to escape while the burner is facing down, and the need for natural air intake for secondary air for burner combustion when the burner is facing up. With this design it is naturally apparent that additional heating and cooking of food can be accomplished on the top flue gas openings, simultaneously while food is cooking below the radiant panel. With this design maximum cooking efficiency is obtained from one burner source and also provides additional cooking areas so necessary when preparing a complete meal, with coffee, etc.

Figure 6:
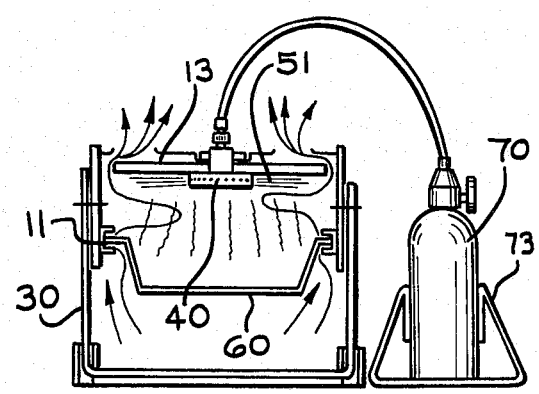
Figure 7:
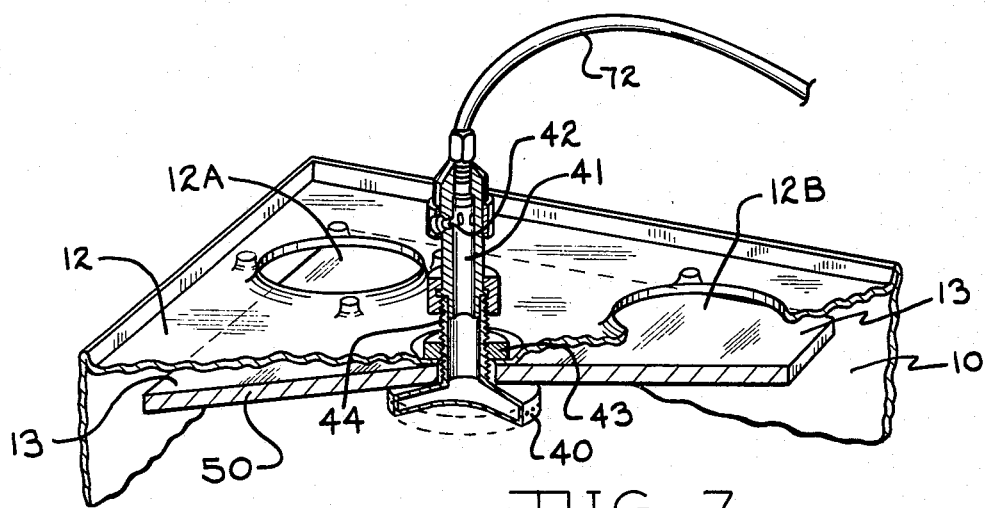
Figure 8:
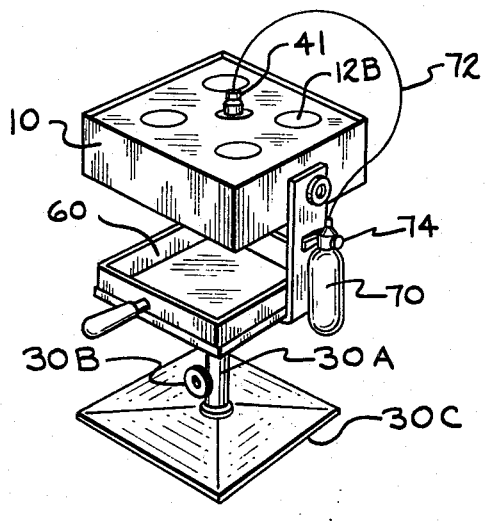
Figure 9:
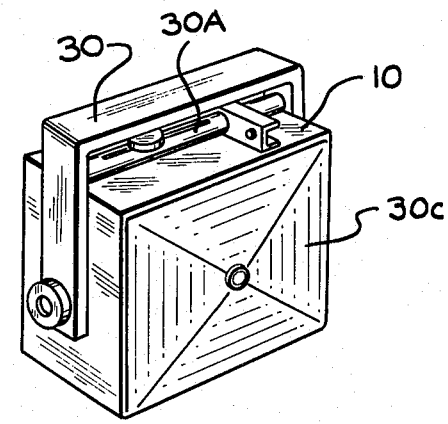

Now referring to the accompanying drawings forming a part of this specification:

FIG. 1 is a perspective view of a portable self-contained "flip-flop" burner unit, FIG. 1-A is a top cut away internal view of the portable unit of FIG. 1 showing the burner, pan, utensils, gas bottle and hose in its stored and portable assembly, FIG. 2 is a perspective view of the opened non assembled unit showing as separate sections, the base lid beneath, and the pan and utensils above, the center flip-flop burner section FIG. 3 is a perspective view of the gas hooked up to the flip-flop burner facing upward with the pan removed vertically upward, FIG. 4 is a perspective view of the flip-flop burner facing downward and with the pan and cooking utensils removed for viewing as indicated, FIG. 5 is a side vertical cut away view of the flip-flop burner and pan facing upward showing the action of the flame, air and flue gases, FIG. 6 is a side verticle cut away view of the flip-flop burner facing downward with the pan beneath and showing the action of the flame, air and flue gases, FIG. 7 is a sectional perspective cut away view of the flip-flop burner facing downward, showing the actual gas burner assembly and burner panel, FIG. 8 is a perpsective view of an alternate type of assembled flip-flop burner, FIG. 9 is a perspective view of the assembly of FIG. 8 disassembled and as a portable self-contained unit.

DESCRIPTION

Now referring again to the attached drawings, FIG. 1 shows the entire burner unit in its disassembled and compact portable state with the flip-flop burner section 10, the base lid 20 and handle legs 30 assembled and fastened by hook fastener 21 and the handle legs 30 being hinged to the flip-flop burner section 10 at 31.

FIG. 1-A illustrates the compactness of the entire burner unit in its disassembled and portable state. Shown within the unit above the burner head 40 and burner panel 50 is the removable burner pan 60 and within the pan 60 enough storage room for the smaller gas bottles 70 and 70-A, spatula 71 and gas hose 72 and other working utensils, FIGS. 2, 3 and 4 illustrate the ease with which the unit is assembled. The base lid 20 is removed first by unlocking fastener 21 and is placed on ground or table facing upward. The lips 22 of the base lid 20 are recessed as at 23 and 23-A to receive and hold the handle legs 30, handle legs 30 being hinged to the outside of the flip-flop burner section by means of a pressure hinge 31 which can be released to permit rotation of the flip-flop burner section or spring-pressured to lock the unit in rigid position. Stops 32 are provided on the flip-flop burner section 10 to limit the rotation of the flip-flop burner section 10 to 180° so that the flip-flop section is either facing upward as in FIG. 2 or downward as in FIG. 4.

The pan 60 is removed as soon as the base lid 20 is removed and the gas bottle 70 and hose 72 attached to the gas burner inlet nozzle 41. The gas bottle 70 is secured in the gas bottle stand 73 and the rubber flexible hose 72 permits the flip-flop burner section to be rotated 180° without the need for disengaging the gas hose.

For compactness as well as for efficient burner design the removable pan 60 is designed to fit into the flip-flop burner section and rest on top of the flip-flop burner section 10 when facing upward, and to slide in and be held beneath it when the flip-flop burner section 10 is facing downward. This is accomplished by the flange extension 61 on pan 60 being designed to rest on top of (when burner is facing upward) or to slide within (when burner is facing downward) the flip-flop burner pan channels 11, FIG. 3 of course illustrates the frying position of the flip-flop burner with the pan 60 above the flame, while FIG. 4 would illustrate the broiling position of the flip-flop furner with the pan 60 beneath the burner and the flue gases escaping upward through the openings in the flip-flop burner cover 12-A-B-C-D, which are also so constructed so as to permit utilizing the flue gas heat for additional cooking, warming or heating purposes of water, coffee or the like while broiling progresses within the pan beneath simultaneously.

While it could be recommended that the flame be extinguished before rotating the flip-flop unit from its frying (upward position) to its broiling (downward position), as long as the pan and utensils are removed from the unit, the flip-flop unit can be rotated without disturbing the flame.

FIG. 5 shows the action of the flame 51 when the flip-flop burner is facing upward. In this position the secondary air for combustion is drawn in part from underneath the burner panel 50 through openings in the flip-flop burners 12-A-B-C&D. The burner panel 50 is positioned above the flip-flop burner section cover 12 so that there is an air space 13 between the flip-flop burner section cover 12 and the burner panel 50. This air space 13 can be accomplished either by providing a spacer between the cover 12 and the panel 50 or as shown in FIG. 5 and 6 by means of an embossed ring on the cover around the burner head inlet nozzle 41 to provide the air space 13 and at the same time a seating base for the burner panel 50.

In actual burning, the burner gas is introduced to the burner head 40 from a pressured commercial type propane bottle 70 by means of propane bottle control valve 74, through flexible rubber hose 72. Nozzle 41 can be provided with primary openings for controlled burning; however the major supply of air comes from beneath the burner panel 50 through cover openings 12A-B-C & D or from the air space above and around panel 50.

With the flip-flop burner facing upward as in FIG. 5 the hot flue gases rise and escape around the sides of pan 60. The heating source for heating pan 60 is then the radiant heat from the flame 51 and burner panel 50 as well as the hot flue gases moving upward and around the pan 60. The burner head 40 is designed with the orifices for fuel gas discharge on the burner sides so as to direct the gas and resultant flame 51 outward and across the burner panel 50 for better flame and heat distribution and also for giving a larger radiating heating surface.

When the flip-flop burner is in its downward facing position as in FIG. 6, the pan 60 is disposed beneath the flame and the secondary air for combustion is drawn upward from beneath and around the pan 60 and again the flame 51 is drawn out and dispersed across the face of the burner panel 50. The flue gases then pass around and over the top of burner panel 50 through the air space 13 and out cover openings 12A-B-C-D.

With the flip-flop burner section facing downward, the flue gases pass upward and through coveropenings 12A-B-C-D, and therefore provide a second heating source for other cooking requirements as shown in FIG. 4. This permits heating water, coffee, milk and other foods over openings 12-A, B-C-D, while the broiling of the main meat of fish or the like continues in pan 60.

In FIG. 7 we can better see the preferred design for the burner head 40 and burner panel 50. Here is shown the primary air openings 42 on the nozzle 41 which openings can be closed or opened to permit controlled flow or primary air into the nozzle which in turn helps to control the distribution of the flame 51 across the face of the burner panel 50. The burner head 40 is designed so that the gas escapes only from the sides or periphery of the burner head to help distribute the flame 51 across the face of the burner panel 50. The burner head 40 and nozzle 41 are held in place by means of a nut 43 that screws down over the outside of the lower nozzle threaded section 44 so as to hold the entire nozzle and burner section securely in place within the flip-flop burner section lid 12.

FIGS. 8 and 9 show an adaptation of the flip-flop burner principle, having the same flip-flop characteristics for the burner (here in FIG. 8 shown in its facing downward position) with an adjustable pan 60 moving up or down on a single base leg 30-A with adjustable holding screw 30-B which can be released for moving the pan 60 up or down, or tightened to secure it in any desired position on the base leg 30-A. Of course the pan 60 is moved upward to the desired heating distance from the flame, and because of its adjustability this distance can be varied for desired and controlled cooking intensity.

FIG. 9 shows the burner unit of FIG. 8 in its broken down and portable state. In FIG. 9 you will note that base leg 30A is retained along with the base stand 30C as part of the compact portable unit, which illustrates the variety of designs that can be attributed to the flip-flop burner and the ease of making such a unit compact and portable for ease of storage and carrying for extensive and varied usages.

It is obvious that once establishing the basic workable design for the flip-flop burner, details and variations can readily be incorporated to increase its versatility and utility. One variation that suggests itself is the substitution of different materials and designs for the burner panel 50. This panel can be of an insulating material either naturally or surface coated to reflect radiant heat from it to the cooking source. Another important material for use as the burner panel 50, could be chosen from the "glass ceramics" family with suitable properties for the purpose. One product in particular suggests itself as particularly suited for this purpose. Commercially it is known as "Cer-Vit" and is manufactured by Owens-Illinois, Inc. It not only is rigid and strong but thermal shock resistant and has essentailly zero thermal expansion, and transmits heat both by conduction and transmission of infrared and remains clean-looking under cooking conditions. Of course other materials can be substituted, however the above are recommended.

Having described the operation and construction of the basic flip-flop burner unit, it is understood that other applications, substitutions and variation of design are possible within the purview of the invention not illustrated or discussed herein, the following is claimed:

1. A reversible flip-flop cooking unit of the class described comprising,
    a rigid flame disbribution panel,
    a gas burner element attached to one of the faces of said panel with a circular burner head designed to permit the gas to emit only from the sides or periphery of said circular burner head and in close proximity to said rigid flame disbribution panel,
    a housing securing said burner and said panel within it, said housing surrounding said burner and said panel on four sides and said housing having an opening on one end and a partially vented cover on its other end so that said burner faces said open side of said housing, and said vented cover is designed to permit the flue gases to escape through it when said burner is facing down and act as a secondary air source when said burner is facing up, and said panel is located with reference to said vented cover to provide a restricted air space between said panel and said vented cover to require the secondary air to flow across the rear side of said panel and around the sides of said panel to reach said burner when said burner is facing up, and the hot air and flue gases to escape around the sides of said panel and to flow across the rear side of said panel and through the vented openings in said partially vented cover when said burner is facing down,
    means for rotating and locking in place said housing, which includes said burner and said panel, 180° so that in one position the burner is facing down and on rotation of 180° the burner is facing up,
    means for introducing and regulating the flow of pressured gas fuel to said burner.

2. The same as claim 1 with said housing being designed to accommodate,
    a hinged handle leg portion that functions as legs to hold said housing in its operating position and as a handle for carrying purposes.
    a removable base lid to cover the open section of said housing and which when removed operates as a base into which said hinged handle legs fit to hold said housing in its operating position,
    a removable cooking pan that is designed to fit completely within said housing for storage purposes and flanged on its outer two sides to rest upon a pair of matching pan channels provided on two sides of the top edge of said housing above said burner when said burner is facing up for frying or storage, and to slide within said matching "pan channels" provided on the two sides of the top of said housing to hang below said burner when said burner is operating and facing down for broiling.

* * * * *